March 9, 1926.
W. F. J. GOERSCH
1,575,910
DEMOUNTABLE RIM FOR CUSHION TIRES
Filed March 21, 1925
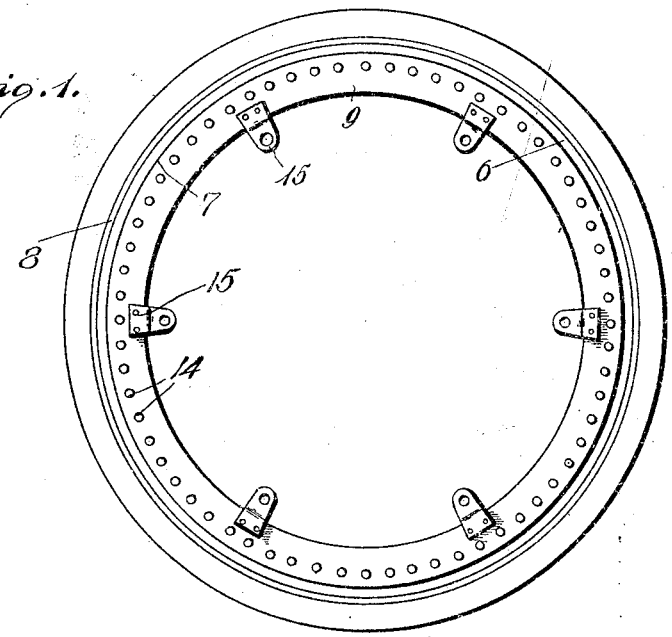
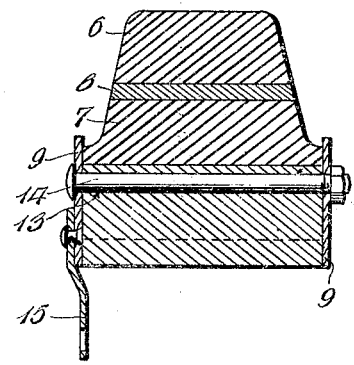
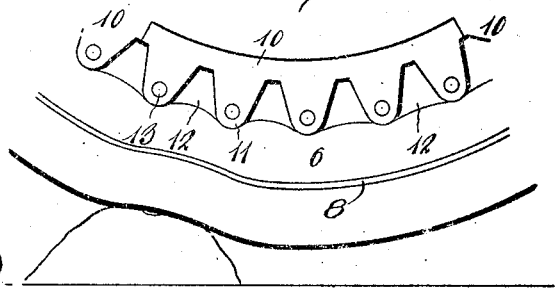
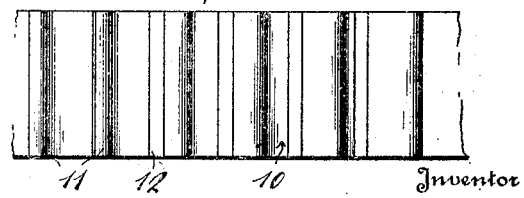
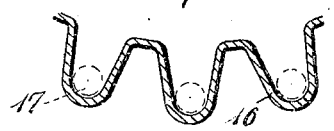
Inventor
William F. J. Goersch
By John A. Bommhardt
Attorney Patented Mar. 9, 1926.

1,575,910

UNITED STATES PATENT OFFICE.

WILLIAM F. J. GOERSCH, OF CLEVELAND, OHIO.

DEMOUNTABLE RIM FOR CUSHION TIRES.

Application filed March 21, 1925. Serial No. 17,275.

*To all whom it may concern:*

Be it known that I, WILLIAM F. J. GOERSCH, a citizen of the Free Town of Danzig, residing at Cleveland, in the county of Cuyahoga and State of Ohio, have invented certain new and useful Improvements in Demountable Rims for Cushion Tires, of which the following is a specification.

This invention relates to improvements in demountable rims for cushion tires having for an object the provision of means whereby a cushion tire may be substituted for the pneumatic type and obtain substantially an equal degree of resiliency and cushioning effect.

Another object is to provide a rim for a cushion tire which will slightly change the point of contact between the rim and tire upon striking an obstacle, thereby avoiding continuous wear at a single point.

A further object is to provide a demountable rim having a serrated or ribbed periphery on which a cushion tire is arranged.

It is likewise an object to provide a demountable rim made up of transversely divided sections having transverse ribs engageable with the soft rubber inner face of a cushion tire.

Other objects will be in part obvious and in part pointed out hereinafter.

In order that the invention and its mode of operation may be readily understood by persons skilled in the art, I have in the accompanying illustrative drawings, and in the following detailed description based thereon set out the preferred embodiment of the same and one modification.

Figure 1 is a side elevation of my improved rim mounting a cushion tire;

Figure 2 is a cross sectional view thereof;

Figure 3 is a view showing the rib structure and the tire action at the point of striking an obstacle;

Figure 4 is a face view showing the rib structure; and

Figure 5 is a sectional view of a modification.

Similar characters of reference designate similar parts throughout.

While this demountable rim is adaptable for association with several well known types of cushion tires, I, as shown in the accompanying drawings preferably employ it in conjunction with a cushion tire wherein the tread portion 6 is made up of tread rubber while the inner portion 7 which contacts with the rim is formed from relatively soft rubber. As indicated in the drawings these two rubber portions are separated by a fabric ring 8 which serves to retain the original shape of the cushion tire. Preferably the peripheral or tread portion of the tire is of less width than the portion which engages the rim, and increases to a width equal to the rim width at a point spaced inwardly from the peripheries of the retaining rings; the object being to prevent the soft rubber from squeezing out over the retaining or locking rings 9 when the tire is compressed.

As illustrated the rim itself is made up of several segments or sections 10. The outer face of the rim is serrated, that is, it is provided with a series of transverse radial ribs 11 which are spaced to provide transverse channels 12. As shown, each rib 11 is preferably though not necessarily provided with a transverse opening 13 through which a connecting bolt 14 passes for securing the locking rings or bands 9 to the opposite sides of the segments 10. These bands and bolts 14 serve to inter-connect the segments 10 to form a complete rim. One of the locking rings carries lugs 15 by means of which the rim may be detachably secured to the ordinary wheel structure.

While I have shown the rim as being made up of solid segments it is quite obvious that a suitable gauge of sheet steel may be corrugated to form the ribs and channels which mount the cushion tire. This modified structure is clearly shown in Figure 5 of the drawings wherein the ribs 16 serve to enclose the connecting bolts 17 which are indicated in dotted lines.

With a structure as shown and described it is clear that there is obtained a high degree of resiliency. Upon striking an obstacle, the soft rubber portion will be squeezed into the transverse channels 12 between the ribs 11 and when the tire has passed over the obstacle the former relation of the rim and tire will have changed a slight degree with the result that continuous wear upon one part of the tire is eliminated. With a rim made up of independent sections as shown it is obvious that injury to one section will not necessitate replacement of an entire rim as in ordinary structures.

Certain changes in the minor details of construction may be resorted to and such of these changes as may fall within the scope of the appended claims, I consider within the spirit of my invention.

I claim:

1. A demountable rim for cushion tires comprising, a circular band, a set of transverse ribs on its periphery, and retaining rings removably carried by the band.

2. A demountable rim for cushion tires comprising, a transversely divided band, transverse ribs on the band periphery, retaining rings, and bolts extending through the ribs and rings to secure the elements together.

3. A demountable rim for cushion tires comprising, a band transversely divided into sections, transverse ribs integrally formed on each section, said ribs having bolt holes, retaining rings at opposite sides of the band, and bolts extending through the holes and rings to secure the elements together.

4. A demountable rim for cushion tires comprising, a set of transversely ribbed segments, retaining rings extending outwardly beyond the ribbed segments, and bolts removably securing the elements together.

In testimony whereof, I affix my signature.

WILLIAM F. J. GOERSCH.